April 21, 1970 E. W. RUMMEL 3,508,139
DRAWING CONSTANT CURRENT FROM A LINE
Filed March 14, 1967
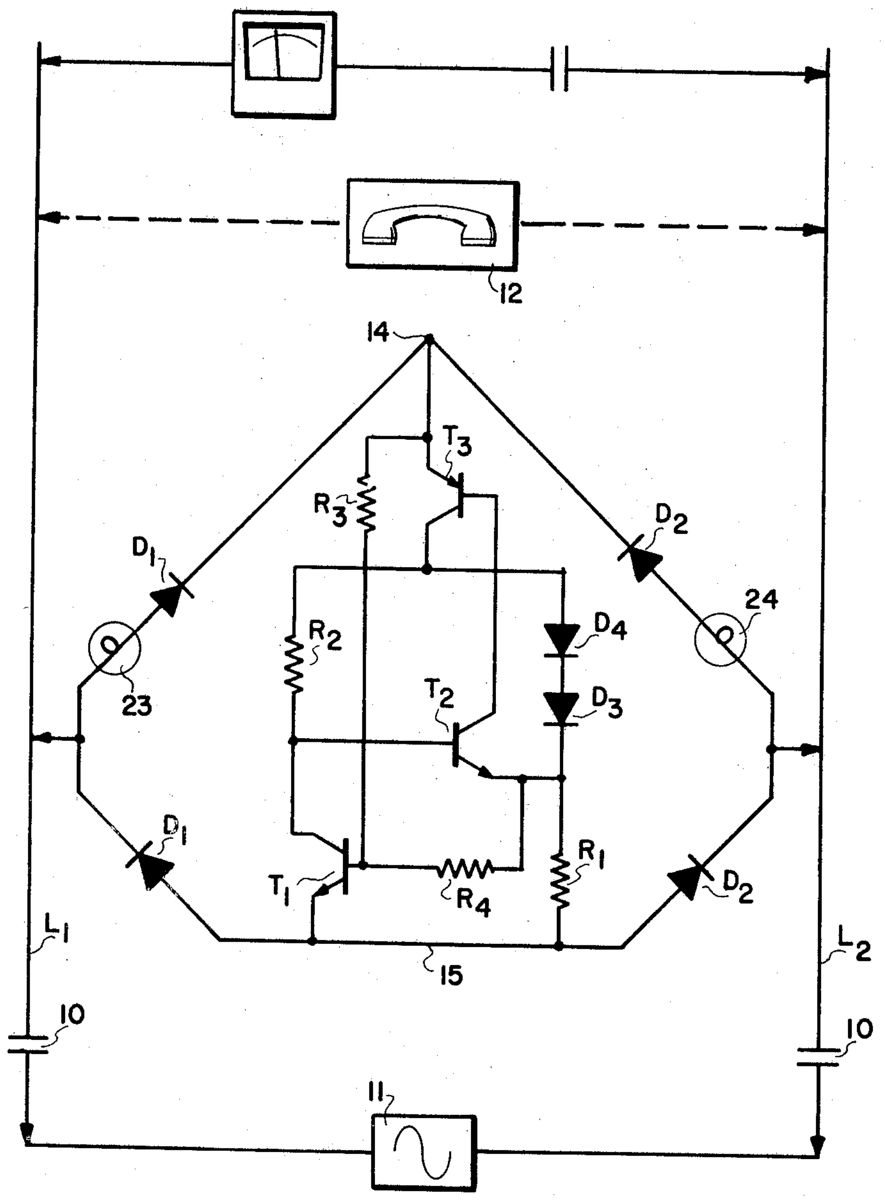
INVENTOR.
Edward W. Rummel
BY J. D. Douglas
his atty

United States Patent Office 3,508,139

Patented Apr. 21, 1970

3,508,139

DRAWING CONSTANT CURRENT FROM A LINE

Edward W. Rummel, Cleveland, Ohio, assignor to Western Reserve Electronics Inc., Cleveland, Ohio, a corporation of Ohio Filed Mar. 14, 1967, Ser. No. 623,096

Int. Cl. G05f *1/20;* H02m *7/18;* H02j *13/00*

U.S. Cl. 323—4 4 Claims

ABSTRACT OF THE DISCLOSURE

A transistorized device connected across a telephone line to draw constant current therefrom to enable testing of the line. The device is connected to the line by a diode bridge having lamps in the bridge arms to indicate line polarity.

This invention relates to electronic circuits which draw a predetermined amount of current in the presence of a varying voltage. More specifically, it includes an electronic line holding circuit.

The invention will be described in conjunction with its use for holding the relays in a telephone line closed but is not necessarily limited in its use on telephone lines. As is well known to those versed in the art, it is frequently necessary to test the characteristics of a telephone line, usually extending from a central or a "repeater" station to a subscriber, particularly for line losses. Such lines include relays having line closing contacts which are normally "locked in" when the telephone is removed from the cradle. In its normal (non-use) position no current is being drawn and the relays are open. When such a line is to be tested it is necessary for the relay contacts to be closed. Under these (closed line) conditions a signal of a predetermined frequency, such as 1000 cycles, may be sent into the line and a measurement of the loss in decibels made at the other end of the line and thus the state of the line determined. In order to keep the relays closed it is common practice to remove the hand set and place a load on the line which usually comprises an inductance in series with a resistance. Such devices cause certain difficulties in that the inductances must be large enough not to shunt the desired signal and still enable the desired current to be drawn to keep the relays closed. Such a device is heavy and materially increases the weight of the instrument which does the measuring. It is also bulky and takes up a considerable amount of space. It is also expensive to manufacture. It has many electrical properties which act to its detriment. For instance, in an iron cored device, should the current through the inductor exceed a certain value, the core becomes saturated and the value of the inductance is no longer what it should be. Because of the variation in line length the normal D.C. voltage on the line terminator will vary making it necessary to provide inductances of different value for different lines.

The present invention contemplates a compact, light weight, inexpensive device which uses solid state components and will draw a constant current of the desired amount when placed in a line having a voltage which may vary, and wherein its operating voltages are derived from the line. It is not polarity conscious and therefore operates regardless of which of its terminals are connected to the line. Indicator means may be provided which will indicate the polarity of the lines if it should be desired.

Its more specific use is for terminating a telephone line and drawing sufficient current to cause the relays to lock in, whereby a signal may be applied to the line without any material shunting effect on the signal.

The figure of the drawing illustrates diagrammatically the device of the invention and its manner of connection for use as a termination for, and to lock in the relays of a telephone line.

As shown in the drawings, line $L_1$ and $L_2$ connect to a remote station, not shown, but wherein the holding relay contacts 10 are shown diagrammatically. Normally the line may be terminated at one end by the usual telephone 12. In this arrangement when the telephone is in the cradle, the only thing on the line is the ringing coils, therefore the line relays are open. The telephone may be removed, when it is desired to test the line, and a 1000 cycle signal applied to the line beyond the holding contacts at 11. The problem, then, is to connect between the lines, a device which will draw a current, the same as the telephone would when the hand set is removed from the cradle, to cause the relays 10 to lock in and complete the circuit without materially affecting the circuit from the testing standpoint.

The outer portion of the circuit comprises four legs, two adjacent legs on one side being connected to one side of the line and the two adjacent legs on the opposite side connected to the other line. Diodes are provided in the legs, those, $D_1$, in the first set of adjacent legs being connected in the same directions and their junctions connected to line $L_1$. The diodes. $D_2$, in the other second or opposite set of legs are also in same direction with each other but in opposite direction to the other diodes and their junctions are connected to the second line $L_2$. It will be apparent that with this configuration no substantial current can pass through the legs because, with a positive voltage applied at $L_2$, current cannot flow down and must go through the upper diode $D_2$. At the other side it is blocked by the upper diode $D_1$ in the upper adjacent leg. Likewise an A.C. signal of a frequency useful to test the lines would not pass through the legs.

The constant current drawing means is connected across the bridge or between the junctions 14–15 of the opposite legs, and includes a PNP transistor $T_3$, an NPN transistor $T_2$, and an NPN transistor $T_1$ and the associated circuitry. The transistor $T_3$ is the main current drawing transistor and in conjunction with the other (controlling) transistors draws the desired current in the presence of varying D.C. line voltages due to varying line resistance. Transistor $T_1$ is a voltage amplifier, the output of which controls $T_2$, and $T_2$ provides the bias for $T_3$ which bias changes with the line voltage and thus maintains the current through $T_3$ constant and of a value to lock in the relays. It will be apparent to those versed in the art that the type of transisors could be reversed.

The emitter of $T_3$ is conected to the bridge diagonal at 14 and the collector is connected by two branches to the other end of the bridge, the right branch being comprised of two diodes $D_4$ and $D_3$ in series with each other and a resistor $R_1$ to the other junction 15, which provides a finite voltage drop and the operating voltage for $T_1$. The left branch includes the resistor $R_2$ which is connected to the collector of an NPN transistor $T_1$, the emitter of which connects to the junction 15. Thus current may flow through this transistor which also operates as a voltage amplifier. The current through transistor $T_3$ splits equally in the two branches and is combined at 15 and passed up through the diode $D_1$ to the line $L_1$.

The output of $T_1$ is connected to and controls $T_2$, the collector being connected to the base of $T_2$. The collector of $T_2$ connects to the base of $T_3$. The emitter of $T_2$ connects to the junction of $D_3$ and $R_1$. $T_2$ is thus the control for $T_3$ and couples $T_1$ to $T_3$.

Resistor $R_3$ connects between the point 14 and the base of $T_1$, providing a voltage feed-back injecting more base current into $T_1$ should the line voltage increase and cause increased heat in $T_3$. This increases the fixed bias to $T_1$ and causes a decrease in fixed bias on $T_2$ and $T_3$. $R_4$ isolates the base of $T_1$ from the emitter of $T_2$ for the purpose of the voltage feed-back.

When the device is connected across the line $L_1$ and $L_2$, after the telephone is removed from the circuit, the device operates to draw current, which may be 20 ma., and to close the contacts 10. A signal may now be injected into the line and the testing proceed in the usual manner. It is apparent that the parameters of the circuit may be adjusted to cause the device to draw the amount of current necessary to lock in the relay contacts and this may be other than 20 ma.

Assuming the line $L_2$ to be the positive side of the line, conventional current flow will be upward through the diode $D_2$ to the point 14. It is blocked by the diode $D_1$ in the adjacent top leg and therefore travels down through the transistor $T_3$, through the emitter and out the collector where it divides in equal parts, one through the right branch through the diodes $D_4$ and $D_3$ and resistor $R_1$ and the other through the resistor $R_2$ and the transistor $T_1$. The current through the two branches combines at the junction 15 of the lower legs and then passes through the lower left diode $D_1$ to the line $L_1$. The collector of $T_3$ is more negative than the emitter because it receives negative voltage from the line from lower diode $D_1$ through the right branch $R_1$, $D_3$ and $D_4$, and through the left branch $T_1$ and $R_2$. The base current from $T_3$ is through transistor $T_2$. Diodes $D_3$ and $D_4$ provide a finite voltage drop which provides the operating voltage for the voltage amplifier $T_1$.

$T_1$ is responsive to variations in line voltages, due largely to differences in line length; its output will vary with line voltage. It will have higher output current, with higher voltage and less collector to emitter voltage which is applied to the base $T_2$ which reduces the current in $T_2$. The output of $T_2$ being connected to the base of $T_3$, as the line voltage goes up, the base bias on $T_3$ decreases and the current through $T_3$ will stay the same. As the voltage goes up, tending to make the main current through $T_3$ go up, the increase in voltage drop across $R_1$ increases the bias to $T_1$. This causes the collector current to $T_1$ to increase. The top of $R_1$ being connected to the emitter of $T_2$, the voltage on the base goes down when the line potential rises. The difference between the voltage on the base and emitter, going down, causes the current in the base to go down and along with it the collector current, in direct proportion. This is the new current that is necessary to keep the current through $T_3$ constant.

Current feedback is realized by the IR drops in $R_1$ and $R_2$. The top $R_1$ goes to emitter of $T_2$ and the bottom to the emitter of $T_1$. A secondary voltage feedback is provided from $D_1$, through $R_3$ to base of $T_1$, injecting more base current into $T_1$. $R_4$ decouples the base of $T_1$ from the emitter of $T_2$ for effecting this voltage feedback. By maintaining a constant current through the transistor $T_3$ in the presence of line voltage changes the dynamic impedance is substantially infinite and therefore one of the test signal current is conducted through the bridge.

It will be apparent that the lamps 23 and 24 may be inserted in the legs and will be selectively energized depending upon through which leg the current from the lines is flowing. If $L_2$ is positive and current flows through upper diode $D_2$, the lamp 24 will be energized. If $L_1$ was positive the flow would be from $L_1$ through the upper diode $D_1$ and lamp 23 would be energized. Thus the polarity of the line is indicated. Regardless of the polarity of the individual lines $L_1$ and $L_2$, the current flow is always into the top of the bridge 14 which thus becomes positive with the bottom 15 being negative. Therefore, the device is not conscious of line polarity.

I claim:

1. A device for connection across a line arranged to draw a predetermined constant amount of current in the presence of variations in line voltage and receiving its operating potential from the line comprising, a bridge having unilateral conductances in each leg and arranged to prevent the flow of current around the bridge and the junctions of adjacent legs on opposite sides of the bridge being arranged to be connected across the line, the other junctions of said legs having constant current drawing means connected directly thereto and extending across the bridge, said current drawing device including a first transistor connected to pass current across the bridge, a second transistor in series with the first transistor and responsive to voltage variation in the line and a third transistor is connected to and controlled by the second transistor and furnishes a bias to the first transistor and causes it to pass constant current.

2. A device as decsribed in claim 1, wherein part of the current from the first transistor passes through the second transistor and circuit means is provided connected to the first transistor and the other side of the bridge for passing the remainder of the current, said last means including a voltage dropping means connected at an intermediate point to the third transistor.

3. A device as described in claim 2, wherein resistance means is provided connected to the same end of the bridge as the first transistor and to the base of the second transistor.

4. A device as described in claim 3, wherein the means for passing the remainder of the current includes a pair of serially connected unilateral conductances and a resistance and said intermediate point is connected to the base of the second transistor and the emitter of the third transistor.

References Cited

UNITED STATES PATENTS

| | | | |
|---|---|---|---|
| 3,161,759 | 12/1964 | Gambill et al. | |
| 3,201,754 | 8/1965 | Reiner et al. | 340—176 X |
| 3,246,233 | 4/1966 | Herz | 323—4 |
| 3,375,434 | 3/1968 | Shapiro | 323—4 |
| 3,408,557 | 10/1968 | Horgan et al. | 323—1 |

FOREIGN PATENTS

| | | |
|---|---|---|
| 130,916 | 12/1932 | Austria. |

LEE T. HIX, Primary Examiner

A. D. PELLINEN, Assistant Examiner

U.S. Cl. X.R.

321—18; 340—176, 253